June 12, 1945.  J. R. OISHEI ET AL  2,378,156
GAUGE
Filed Jan. 27, 1943
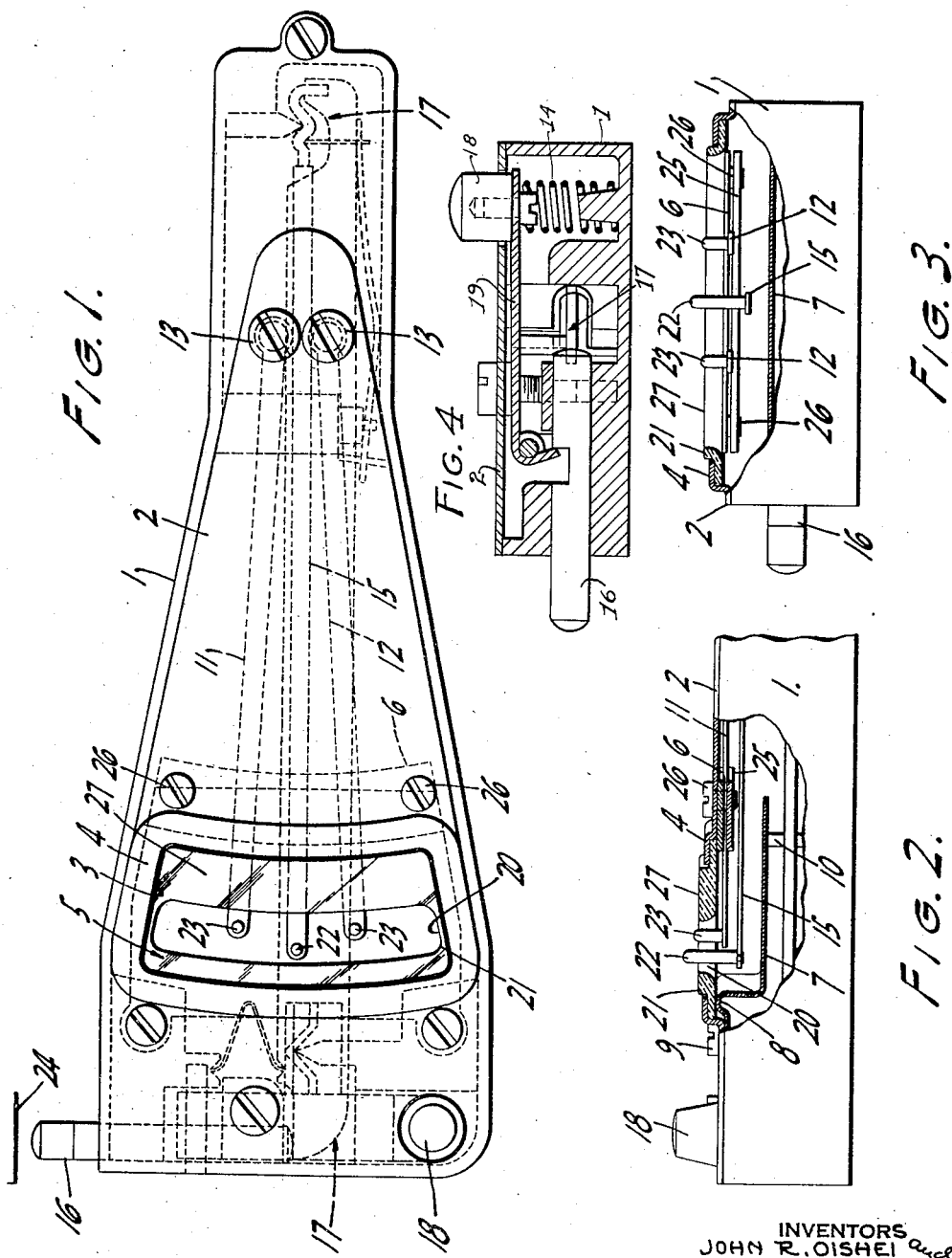
INVENTORS
JOHN R. OISHEI and
ERWIN C. HORTON.
BY
Bean, Brown, Buckley & Bean
ATTORNEYS Patented June 12, 1945

2,378,156

UNITED STATES PATENT OFFICE 2,378,156

GAUGE

John R. Oishei, Buffalo, and Erwin C. Horton, Hamburg, N. Y., assignors to Trico Products Corporation, Buffalo, N. Y.

Application January 27, 1943, Serial No. 473,746

6 Claims. (Cl. 116—114)

This invention relates to a micrometer type of gauge and it has for its object to provide an instrument of this type particularly adapted for use by blind persons in the dimensional measurement and testing of parts.

In the mass production methods of present day manufacture wherein articles or parts are made in large quantities it is desirable to measure or compare such parts individually to a master part or to a dimensional gauging device for securing accuracy and proper fitting when related to other parts in an intended use. Plus and minus tolerances are allowed and these are readily determined by a micrometer instrument utilizing an amplifying leverage for indicating the dimensional measurement by the aid of a pointer.

The object of the present invention is to provide a gauging instrument of this character by which comparative tests of articles may be readily made by those whose eyesight is vitally impaired or lost entirely. The invention further has for its object to provide an instrument of this type which is practical and efficient and may be used by blind persons in a facile manner for the accurate testing of work pieces.

In the drawing

Fig. 1 is a plan view of an instrument embodying the present invention;

Fig. 2 is a fragmentary side elevation with portions broken away for clarity;

Fig. 3 is an end elevation with portions broken away to show more clearly the mounting and elevational location of the pointer and the tolerance limit indicator, and Fig. 4 is a sectional view depicting more clearly the retractor for the work engaging plunger.

Referring more particularly to the drawing, the numeral 1 indicates a box-like housing or casing for the gauging mechanism, and 2 indicates the removable cover having a window opening 3 with a marginal flange 4 to provide a seat for a window panel 5 of glass, plastic, or the like. A retaining plate 6 may be spot welded or otherwise secured to the underside of the cover and in overhanging relation to one edge of the panel for securing the same in position while a septum plate 7 which provides a finished backing for the window and a shield to the underlying mechanism, has a bead portion 8 clamping upon the opposite edge of the panel. The plate 7 which is secured in position by the cover attaching screws 9 has an offset portion spaced from the panel and given support by a shoulder 10. Plus and minus tolerance indicators 11 and 12 are visible through the windows and each is herein depicted in the form of an arm mounted on the underside of the cover by a friction held stud or rivet 13. By means of a screw driver the studs may be turned to adjust the location of the indicators in the window. A pointer 15 operates in the window to indicate the dimensional characteristic of the work piece, and this pointer is operatively connected to a work engaging plunger 16 by a movement amplifying leverage generally shown as 17. The plunger is spring projected but normally held retracted by a spring 14 acting through a bell crank lever 19, the latter being rendered inoperative upon depressing a release button 18 so that the plunger will be free to perform the gauging operation, all of which is more fully described in copending application Serial Number 441,614, which issued November 7, 1944, as Patent No. 2,362,203.

In accordance with the illustrated embodiment of the present invention, the window panel 5 is formed with an arcuate slot 20 defined by an upstanding rim 21, and extending upwardly through the slot are a pointer carried pin 22 and a pair of tolerance indicator pins 23 one on each indicator arm. Preferably, the pointer pin 22 extends higher than the tolerance pins 23 for more readily detecting the pointer location. The arcuate path of travel for the pointer pin is shown beyond the pins 23 to give a triangular arrangement of points which are susceptible to touch. The operator, with one hand resting on the instrument and using the other hand to insert a work piece between a fixed anvil 24, will with his thumb depress the release button to permit the gauging plunger moving against the work piece and then with one or more fingers feel the relative location of the pointer and tolerance pins 22 to thereby determine the acceptability of the tested piece.

A clamping plate 25 underlying the tolerance members adjacent the window gives substantial support to the tolerance pins and functionally binds them in their given adjustments against the panel retaining plate 6 under the pressure exerted by the end screws 26. The pointer arm swings in a plane beneath the supporting plate 25 and is free to yield to finger pressure relative to the more substantially supported tolerance indicators. Consequently, the operator may readily detect the pointer by reason of its greater yieldableness of flexibleness under light finger pressure. The index and second fingers may rest upon the rim of the slot in a position to overhang the tolerance pins sufficiently far for being wiped lightly by the pointer pin as it swings in its path of operation. The finger is supported firmly on the rim, which latter is broadened at the inner side of the slot to provide a finger supporting pad 27, and therefore the projecting tip of the finger is positioned to overhand the moving pointer pin which extends higher than the tolerance pin and conforms to the upward curvature of the under surface of the fingertip. However the pointer pin may be of the same upward extent or even to a less extent if desired, in which event the finger will be accordingly adjusted to contact both pins to obtain the reading. The closer the tolerance pins are brought together the further they are spaced from the path of the pointer pin thereby to facilitate the reading, this inward adjustment being accomplished by reason of the eccentric mountings of the pins.

The gauge of the present invention therefore utilizes the tangible point principle of the Braille system for the blind, the location of the pointer pin relative to either or both tolerance pins being readily determined by the touch, and while the foregoing description has been given in detail it is obvious that the inventive principles involved may be applied to other physical embodiments without departing from the scope and spirit of the invention claimed.

What is claimed is:

1. A micrometer gauge for the blind, comprising a pointer movable back and forth in a definite path and having a laterally extending upstanding touch pin indicating a dimensional characteristic of a workpiece, and a tolerance indicator carrying a second upstanding touch pin in proximity to the path of the pointer pin, said upstanding touch pins providing tangible points for obtaining the reading of the gauge by touch.

2. A micrometer gauge for the blind, comprising a movable pointer having an upstanding terminal part to provide a tangible point projecting through a window slot and standing normal to the plane of the window, and a tolerance limit member arranged adjacent the path of the pointer part and likewise having an upstanding terminal part standing normal to the window to provide a tangible point projecting to a different extent than the pointer part whereby both tangible points are subject to the touch of the user, both upstanding terminal parts projecting in the same direction and being substantially parallel to each other.

3. A micrometer gauge for the blind, comprising a casing having an arcuate slot with an upstanding marginal rim in the form of a finger supporting pad, gauging means in the casing including a swingable pointer having an upstanding tangible point projecting through the slot and above the marginal rim, a fixed standing tangible point projecting above the pad adjacent the path of the first tangible point and in the same direction as the latter but to a lesser extent, the second tangible point being disposed between the path of the first tangible point and the pad for engaging a pad supported finger at a place closer to the pad than the place of contact for the movable tangible point.

4. A micrometer gauge for the blind, comprising a casing having a window slot, gauging means in the casing including a pointer having an upstanding tangible point projecting through and moving in the window slot lengthwise of the latter, and a tolerance limit member having a second tangible point arranged adjacent the path of the first tangible point but projecting to a different extent than the latter, the one of said tangible points which project to a greater extent being yieldably supported for depression relative to the other tangible point.

5. A micrometer gauge for the blind, comprising a casing having a cover with a window slot, gauging means in the casing including a pointer with an upstanding tangible point projecting through and moving in the window slot longitudinally thereof, plus and minus tolerance indicators adjustably carried by the cover and each having an upstanding tangible point adjacent the path of the first tangible point, and a clamping plate secured to the cover adjacent the window slot and underlying the tolerance indicators for giving substantial support to their tangible points and to secure the indicators firmly in adjusted position.

6. A micrometer gauge for the blind, comprising a casing having a window slot, a work engaging member movably supported thereon, gauging means in the casing operable by the work engaging member and including a pointer having an upstanding tangible point projecting through and moving in the window slot lengthwise of the latter, manually controlled retractable means operable to withdraw the work engaging member and to hold the tangible point normally at one end of the window slot, and a tolerance indicator having a second upstanding point arranged adjacent the path of the first tangible point for joint touch reading therewith following the manual actuation of said retractable means to release the work engaging member.

JOHN R. OISHEI.
ERWIN C. HORTON.